H. C. STEINMETZ.
REPAIR HANGER.
APPLICATION FILED MAR. 12, 1920.
1,358,260.
Patented Nov. 9, 1920.
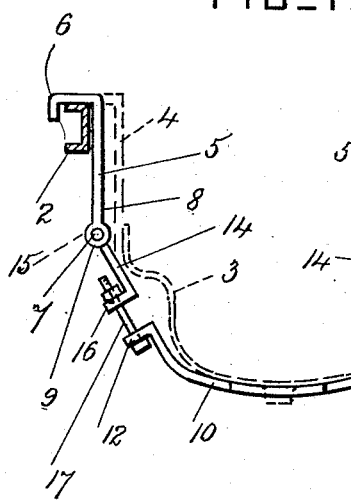
FIG_1_
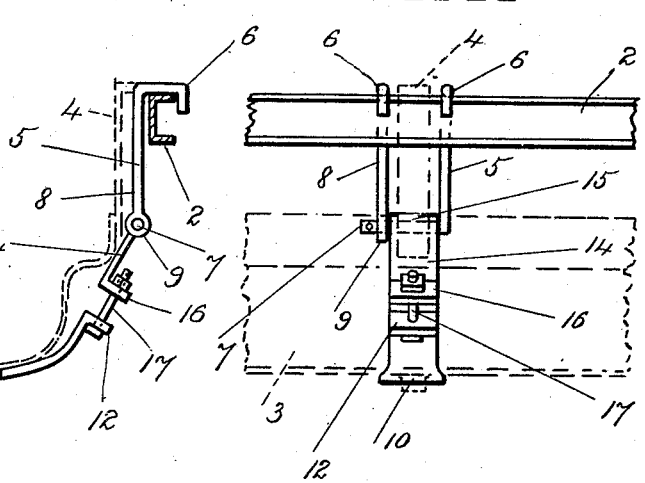
FIG_2_
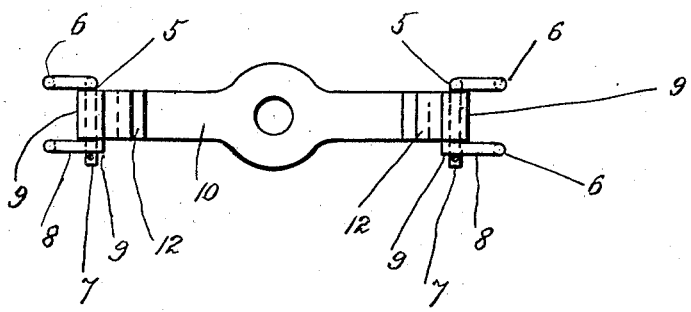
FIG_3_
Inventor
Henry C. Steinmetz
by Herbert W. J. Jenner
Attorney

UNITED STATES PATENT OFFICE.

HENRY C. STEINMETZ, OF PACIFIC GROVE, CALIFORNIA.

REPAIR-HANGER.

1,358,260.　　　　Specification of Letters Patent.　　Patented Nov. 9, 1920.

Application filed March 12, 1920. Serial No. 365,368.

*To all whom it may concern:*

Be it known that I, HENRY C. STEINMETZ, a citizen of the United States, residing at Pacific Grove, in the county of Monterey and State of California, have invented certain new and useful Improvements in Repair-Hangers, of which the following is a specification.

This invention relates to devices for supporting the crank cases of motor cars; and it consists in the novel construction and combination of the parts hereinafter fully described and claimed whereby the crank cases are supported when their ordinary attachments are broken, or are reinforced to prevent breakage. This invention is an improvement upon the devices for which Letters Patent have been granted to me on September 16, 1919.

In the drawings, Figure 1 is an end view of the supporting hanger, showing portions of the frame of the motor car in cross-section. Fig. 2 is a side view of the same, and Fig. 3 is a plan view.

The frame of the motor car has two longitudinal side bars 2 of any suitable cross-section. The crank case 3, in which the engine crank and other parts of the motor are inclosed, is partially shown in dotted lines in Fig. 1. As ordinarily constructed this crank case is supported from the side bars 2 by lugs 4, and these lugs are frequently broken.

Two bails 5 are provided, and they have hooks 6 at their upper parts which are hooked over the side bars 2 so that the bails hang between the side bars and the crank case. In order to facilitate the attachment of the device to a crank case with a broken lug, one or both of the bails have a horizontal pin 7 at the bottom of one side member, and the other side member 8 is formed separately, and has an eye 9 which is slipped over the pin 7 and is held in place by a cotter pin.

A sling 10 is provided for the bottom of the crank case to rest in, and this sling is curved to suit the crank case, and has downwardly and outwardly projecting lugs 12 at its ends.

Angle-shaped brackets 14 are provided, and have eyes 15 at their upper ends which are pivoted on the horizontal pins 7 of the bails. The brackets 14 have lugs 16 at their lower ends which project downwardly and outwardly substantially parallel to the lugs 12. Screwthreaded fastening bolts 17 are provided, and are arranged in holes in the lugs 12 and 16 so as to couple the sling to the bails when their nuts are screwed up. The bolts 17 fit loosely in the holes in the lugs, and permit the sling to adapt itself to any slight irregularity on the surface of the crank case.

What I claim is:

A repair hanger for the crank case of a motor car, comprising bails provided with means for engaging with the car frame, one bail being formed with separate side members one of which has a horizontal pin and the other an eye which engages with the said pin, a sling for the crank case, angle-shaped brackets pivoted to the bails, and means for securing the said brackets to the end portions of the sling.

In testimony whereof I have affixed my signature.

HENRY C. STEINMETZ.